US012590564B2

(12) United States Patent
Munson, Jr. et al.

(10) Patent No.: US 12,590,564 B2
(45) Date of Patent: Mar. 31, 2026

(54) WATER WAVE ENERGY HARVESTER

(71) Applicant: FOI Group LLC, Dallas, TX (US)

(72) Inventors: David M. Munson, Jr., Dallas, TX (US); David S. Flatt, Forney, TX (US)

(73) Assignee: FOI Group, LLC, Dallas, TX (US)

(*) Notice: Subject to any disclaimer, the term of this patent is extended or adjusted under 35 U.S.C. 154(b) by 0 days.

(21) Appl. No.: 18/840,455

(22) PCT Filed: Feb. 21, 2023

(86) PCT No.: PCT/US2023/013545

§ 371 (c)(1),
(2) Date: Aug. 21, 2024

(87) PCT Pub. No.: WO2023/158885

PCT Pub. Date: Aug. 24, 2023

(65) Prior Publication Data

US 2025/0163882 A1 May 22, 2025

Related U.S. Application Data

(60) Provisional application No. 63/312,388, filed on Feb. 21, 2022.

(51) Int. Cl.
*F03B 13/06* (2006.01)
*E02B 9/08* (2006.01)
(Continued)

(52) U.S. Cl.
CPC ................ *F03B 13/06* (2013.01); *E02B 9/08* (2013.01); *F03B 13/18* (2013.01); *F03B 13/22* (2013.01)

(58) Field of Classification Search
CPC .......... F03B 13/06; F03B 13/18; F03B 13/22; E02B 9/08
See application file for complete search history.

(56) References Cited

U.S. PATENT DOCUMENTS

| | | | | |
|---|---|---|---|---|
| 647,638 A | | 4/1900 | Todd | |
| 1,751,513 A | * | 3/1930 | Gaede | F03B 17/066 415/5 |

(Continued)

FOREIGN PATENT DOCUMENTS

| | | |
|---|---|---|
| CN | 102518548 B | 10/2013 |
| CN | 205638776 U | 10/2016 |

(Continued)

OTHER PUBLICATIONS

Translation DE-102016010285-A1 (Year: 2025).*

(Continued)

*Primary Examiner* — J. T. Newton
(74) *Attorney, Agent, or Firm* — Michael Best & Friedrich LLP

(57) ABSTRACT

A wave energy harvester includes an elongated coupler that extends horizontally above a body of water. The coupler includes a conveyor that translates along its length. Disposed on the conveyor a plurality of vanes that, when between the coupler and the water, are contacted by the peaks of waves passing beneath the coupler, resulting in the translation of the vanes and the conveyor. Translation of the conveyor rotates an output that performs work to store the harvested kinetic energy to stored energy and/or to use it for other purposes, such as in power generation.

20 Claims, 5 Drawing Sheets

(51) Int. Cl.
*F03B 13/18* (2006.01)
*F03B 13/22* (2006.01)

(56) References Cited

U.S. PATENT DOCUMENTS

| | | | | |
|---|---|---|---|---|
| 3,504,985 | A * | 4/1970 | Fisher | F03B 13/1835 416/7 |
| 3,927,330 | A * | 12/1975 | Skorupinski | F03B 17/066 415/5 |
| 3,983,404 | A | 9/1976 | Sherrard | |
| 4,112,686 | A * | 9/1978 | Trotta | F03G 3/00 415/5 |
| 4,350,474 | A | 9/1982 | Murphy | |
| 5,136,174 | A * | 8/1992 | Simoni | F03B 17/062 290/43 |
| 6,809,430 | B2 * | 10/2004 | Diederich | F03B 17/066 416/8 |
| 7,213,398 | B2 | 5/2007 | Takeuchi | |
| 7,785,065 | B2 * | 8/2010 | Clemens | F03B 17/066 416/8 |
| 8,084,873 | B2 | 12/2011 | Carter | |
| 8,378,517 | B2 * | 2/2013 | Lee | F03D 5/02 290/55 |
| 8,890,353 | B2 * | 11/2014 | Cunnane | F03B 13/10 415/5 |
| 8,933,574 | B2 | 1/2015 | Song | |
| 9,309,861 | B1 | 4/2016 | Gaul | |
| 9,689,369 | B2 | 6/2017 | Sieber | |
| 10,006,434 | B1 | 6/2018 | Peed | |
| 10,527,021 | B2 | 1/2020 | Schneider | |
| 11,415,098 | B2 | 8/2022 | Fagereng | |
| 11,536,244 | B2 | 12/2022 | Wilson et al. | |
| 11,761,417 | B2 | 9/2023 | Wilson et al. | |
| 11,802,536 | B1 | 10/2023 | Deiana | |
| 12,163,501 | B2 | 12/2024 | Wilson et al. | |
| 2006/0192389 | A1 | 8/2006 | Perry et al. | |
| 2010/0140944 | A1 * | 6/2010 | Gardiner | F03B 13/16 290/53 |
| 2010/0207391 | A1 | 8/2010 | Farb | |
| 2011/0062715 | A1 | 3/2011 | Dimaggio | |
| 2011/0254270 | A1 | 10/2011 | Ayntrazi | |
| 2012/0032444 | A1 | 2/2012 | Burton | |
| 2012/0169056 | A1 * | 7/2012 | Peed | F03B 17/068 290/53 |
| 2015/0252774 | A1 | 9/2015 | Shimizu | |
| 2016/0186715 | A1 * | 6/2016 | Fait | F03B 13/20 290/53 |
| 2018/0058419 | A1 | 3/2018 | Liao et al. | |
| 2018/0202414 | A1 | 7/2018 | Hume | |
| 2018/0209397 | A1 | 7/2018 | Pai | |
| 2025/0101943 | A1 | 3/2025 | Wilson et al. | |

FOREIGN PATENT DOCUMENTS

| | | | | |
|---|---|---|---|---|
| CN | 106762365 | A | 5/2017 | |
| CN | 207178094 | U | 4/2018 | |
| DE | 947300 | | 8/1956 | |
| DE | 2555120 | A1 | 6/1976 | |
| DE | 10358240 | A1 * | 6/2005 | F03B 17/066 |
| DE | 202013002045 | U1 * | 7/2013 | F03B 17/066 |
| DE | 102016010285 | A1 * | 3/2018 | F03B 13/1835 |
| DE | 202018105742 | U1 | 11/2018 | |
| ES | 2278510 | A1 | 8/2007 | |
| GB | 2419383 | A | 4/2006 | |
| JP | S50095636 | A | 7/1975 | |
| JP | S57151074 | | 9/1982 | |
| JP | 3147399 | U | 12/2008 | |
| KR | 200329746 | Y1 | 10/2003 | |
| KR | 20080098134 | | 11/2008 | |
| KR | 20080098134 | A | 11/2008 | |
| KR | 20100094767 | | 8/2010 | |
| KR | 20150140058 | A | 12/2015 | |
| KR | 20190030245 | A | 3/2019 | |
| WO | WO-9504885 | A1 * | 2/1995 | F03B 13/1835 |
| WO | 2008044040 | A2 | 4/2008 | |
| WO | 2012044266 | | 4/2012 | |
| WO | WO-2012044266 | A9 * | 4/2012 | F03B 17/066 |
| WO | 2016110744 | A1 | 7/2016 | |
| WO | 2017081510 | A1 | 5/2017 | |
| WO | WO-2023158885 | A1 * | 8/2023 | |
| WO | 2024194028 | A1 | 9/2024 | |
| WO | 2025027651 | A2 | 2/2025 | |

OTHER PUBLICATIONS

Trans. DE-10358240-A1 (Year: 2026).*
Trans. DE-202013002045-U1 (Year: 2026).*
Written Opinion of the International Search Authority, PCT/US23/13545 (May 15, 2023) 9 pages.

* cited by examiner

WATER WAVE ENERGY HARVESTER

BACKGROUND

The subject matter of the disclosure pertains to generally harvesting energy from water waves.

Waves on oceans and other bodies of water are primarily caused by wind but can also be caused by moving water vessels such as boats and ships and other natural events. Waves are formed by water molecules moving in a circular path, during which they are displaced vertically and laterally. Water molecules move vertically as a wave's amplitude increases. When the wave nears its peak amplitude, the water molecules are moving predominately horizontally, in the same direction as the wave is propagating. The direction of wave propagation will be referred to as the "forward" direction. The molecules then transition to moving downwardly and then rearwardly as a trough behind the waveforms. This circular motion is then repeated with successive waves. Due to this movement, a molecule of water in a wave will have kinetic energy that is proportional to the product of the mass of the molecule and the square of its velocity. Because velocity is a vector, kinetic energy is also a vector quantity. As a water molecule moves vertically because of a passing wave, it also gains and loses potential energy.

Water waves can carry tremendous amounts of energy. Various methods and apparatus have been proposed to harvest and store this energy, particularly energy from wind-induced waves.

SUMMARY

The subject matter of this disclosure pertains to improved methods and apparatus for harvesting kinetic energy from the motion of water molecules primarily in the direction of wave prorogation that is associated with wind-driven and similar waves in bodies of water.

DETAILED DESCRIPTION OF EXEMPLARY EMBODIMENTS

Figure 1:
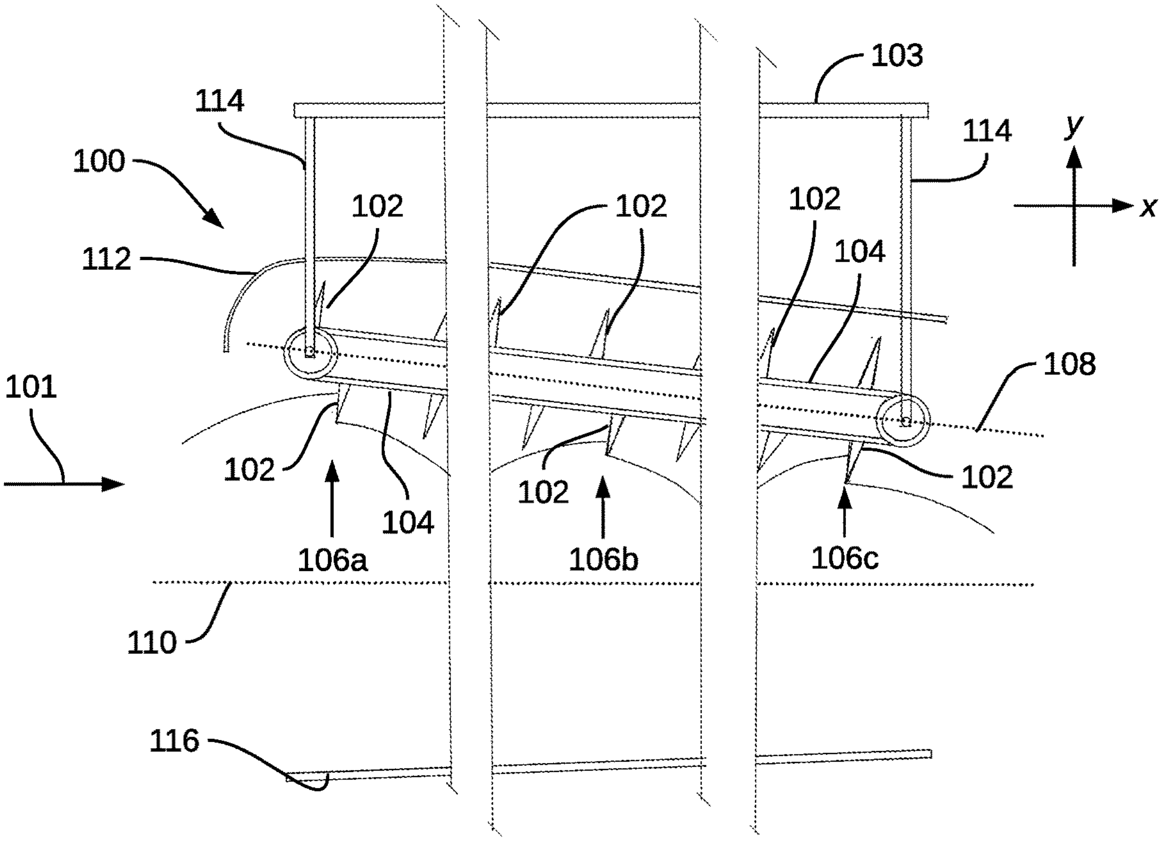
FIG. 1 is a schematic representation of a water wave coupling.

In the following description, like numbers refer to like elements.

Disclosed below are representative, non-limiting examples of methods and representative embodiments of a mechanical system—a wave harvester—for harvesting kinetic energy of water molecules associated with waves that develop on bodies of water by reason of wind or other natural phenomena, as well as passing boats and ships.

Such wave energy harvester includes an elongated coupler that is configured to be positioned above the water. In a mutually orthogonal, three-axis frame of reference used for this description, the x-axis will refer to a horizontal axis extending along the length of the wave harvester, and the y-axis will be vertical. The coupler is mounted or positioned on a frame in a manner that permits it to translate with respect to the harvester generally along its x-axis. When deployed for use, the wave harvester coupler is located above the surface of the water so that it extends along the x-axis of the harvester, generally in a horizontal fashion above the level of the water when there are no waves. In operation, the coupler is positioned at a height above the water so that the peaks of waves passing beneath it will tend to contact one of a plurality of wave-contacting surfaces that descend from the coupler at spaced apart (though not necessarily regular) intervals. Wave heights are, of course, not always uniform. Therefore, optimal contact with a wave-contacting surface is not expected for every wave. The height of the coupler can be fixed based on predominate wave conditions or adjustable to accommodate predicted or actual conditions. The force of the water hitting against the wave-contacting surfaces causes the wave-contacting surfaces to translate the coupler generally in a direction that is primarily, though not necessarily exclusively, along its x-axis. The kinetic energy of the water molecules in the direction of the translation is thereby transferred to the coupler. The translational movement of the coupler is transferred to a rotational output that is an input to a system that converts at least some of the harvested kinetic energy to another form of energy or uses it to perform work.

For optimal coupling, the orientation of the x-axis of the wave harvester should be oriented along the direction of propagation of the waves but does not have to be. Depending on the body of water and wind direction, waves may not always travel in the same direction. The x-axis of the coupler is, therefore, preferably at least generally aligned with the predominant direction of travel or prorogation of the waves. It may, optionally, be configured or deployed to allow its orientation to be changed.

The extended length of the coupler increases the probability of better and more frequent contact with waves when the kinetic energy of the water is near its greatest, thus increasing the transfer of kinetic energy. For example, if its length equals or exceeds the wavelengths of the waves, it is more likely to engage a peak of a wave wherever it may occur relative to the coupler. If the wave contacting surfaces vary in height—such as by tilting the coupler—the coupler is more likely to make optimate contact with each wave when wave heights are not uniform. Furthermore, having a wave-contacting surface that translates along the length of the coupler allows for a longer contact time with a peak of a wave. It may also allow for multiple wave peaks to be contacting different wave-contacting surfaces of the coupler at the same time. Furthermore, depending on parameters such as wavelength, length of the coupler, and the amount of contact being made with each wave peak, a coupler could be adapted to increase the probability of it being, at any given moment, in contact with at least one of the wave peaks passing beneath it, resulting in a force being continuously applied to the coupler. The total force applied to the coupler at any given time will likely vary, but it could be sufficient to keep the coupler in motion, thus improving the efficiency of its operation.

A wave energy harvester could, optionally, be combined with means for harvesting kinetic energy associated with the movement of the water molecules in a wave along, for example, a vertical or z-axis. A harvester may also include means for harvesting potential energy associated with the change in water level associated with the body of water associated with tides or waves—for example, a float coupled with a fixed structure—or currents.

FIG. 1 illustrates schematically (and not to scale) a non-limiting, representative example of a coupler 100 for a wave harvester. The coupler 100 has an elongated axis that extends in the direction of wave movement 101. The coupler is configured to translate in the direction of the wave movement. The wave coupler has multiple contacting surfaces in the form of vanes 102 affixed or coupled to a conveyor 104 along its longitudinal length, represented by axis 108. The conveyor is held in position above the water at a height (measured along the y-axis) that allows for the vanes to contact the top or peaks of waves passing beneath it. The conveyor is mounted to a frame, which is schematically represented by a frame 103, that is used to position the conveyor. The water level is represented by line 110. The top or peak of a wave is where the water molecules have their greatest forward or x-axis velocity and, thus, the point of the greatest x-axis kinetic energy.

Each of the vanes has water-contacting surfaces oriented and shaped so that, when correctly positioned, water molecules near a top of a wave will hit against the water-contacting surfaces. The force of the impact of the water molecules causes the vane to translate primarily along a path oriented in the direction of movement of the water waves. The figure illustrates three wave peaks 106*a*, 106*b*, and 106*c*, respectively, hitting three different vanes at different locations along the length of the coupler. The x-axis component of the contacting force of water at the top or peak of the wave will, if it has sufficient magnitude, cause the vane to move longitudinally, thereby causing the conveyor to translate in the longitudinal direction primarily along the x-axis. It will also tend to knock down the top of the wave, possibly shortening the height of the wave. This behavior is represented conceptually by the decreasing height of the wave peaks from peak 106*a* to 106*c*. The coupler may, optionally, be configured so that a wave contacting surface portion of the vanes become progressively lower as they move toward the rear of the coupler. This may improve the contact of a wave with another vane of the coupler as it travels toward the back end of the coupler. In the illustrated embodiment, the coupler is positioned at an angle to the water level 110, which can be seen by comparing the orientation of axis 108 to the water level 110. This angle can be made adjustable by raising or lowering one end of the coupler with respect to the other end. Alternatively, the vanes could be adapted to extend further from the conveyor as they approach the rear of the coupler, such as by telescoping downwardly. The coupler could also be formed with a cross-sectional (taken long its x-axis) shape that corresponds to the expected reduction of wave heights so that the wave contacting portions of the vanes better match expected wave heights.

Each vane is coupled or connected with and extends from the conveyor at a fixed position when the vane is pointing downwardly to engage waves. The vanes are, for example, spaced apart at regular intervals but do not have to be. The conveyor functions to transfer forces applied to the vanes by the water to an output of the coupler and to move vanes together in unison along a predetermined path above the water. In the example, the conveyor forms a continuous loop. It moves along a continuous path that extends longitudinally from front to back, during which attached vanes extend downwardly in a position to contact wave peaks passing beneath the coupler, causing the vane and, thus, the conveyor to translate rearwardly.

In one embodiment of a coupler, the vanes remained mounted in a fixed position on the conveyor throughout the movement of the conveyor along its front-to-back path and back-to-front path. The translational movement of the conveyor drives a rotational output which is coupled to an input of an energy storage system that stores at least some of the kinetic energy transferred from the waves to the conveyor. Optionally, some or all the power output of the conveyor could instead be used to perform other types of work.

The harvester may have an optional shield 112 that extends in front of and over the top of the coupler to prevent large waves from crashing over the coupler and hitting the components of the coupler that are moving from back to front. Alternatively, or in addition, the vanes could be removably attached or connected to the conveyor. They are attached to the conveyor at the front of the coupler for engagement with wave peaks when the conveyor is moving front-to-back and then disconnected to be returned to the front of the coupler by another means. Optionally, the vanes may also fold, pivot, or retract as they move from the front to the back, remaining attached to the conveyor to a conveyor or another means for carrying them to the front of the coupler. Disconnecting or lowering the profile of the vanes as they return avoids or reduces forces on the vanes from wind and water splashing across the top of the coupler, which would generate a counterforce on the conveyor.

Representative, non-limiting examples of a conveyor include flexible belts, one or more parallel chains, one or more cables, a plurality of articulating panels connected by hinges, a chain, cable, or other means, or another type of conveyor. The chain may, for example, include rollers to roll along an underlying surface of, for example, a frame or other structure for the conveyor that acts as a guide. The surface may include a track to guide the rollers. Having a substantially solid, continuous surface located above the vanes as they point down when engaging the waves can help to redirect larger waves downwardly toward the vanes to increase the force applied to the vanes and to prevent the water from interfering with or adding resistance to the back-to-front movement of the conveyor. The conveyor itself may, instead, form this wave-redirecting surface. For example, a conveyor made with a flexible belt or for example, segments of rigid plates mounted to rollers or a chain, the rigid plates separating or articulating to allow the conveyor to turn but fit together as it moves along the front-to-back path can be used to form a substantially continuous surface that functions to redirect larger waves with peaks above the vanes and/or prevent water from splashing against elements of the conveyor or vanes moving from back-to-front.

In the simplified example that is illustrated, the conveyor is mounted between two spaced-apart laterally extending (along the z-axis) members that help to support the conveyor on the frame of the harvester where it turns at each end of the coupler. Such members may comprise, for example, rotating structures such as wheels, including cogs, sprocket wheels, and rollers, fixed structures with arcuate surfaces on which the conveyor may slide or roll, or a combination of them. The conveyor can be further supported by support members located between its ends using rotating—a series of rollers, for example—or non-rotating structures on which the conveyor may slide or roll. The conveyor is coupled at least one point with a rotational member to transfer the translational motion of the conveyor to a rotational output for use as input to an energy storage system or to another system to perform work.

In any given period, the height or amplitude of the waves will tend to vary from one to the next, even though the median or mean wave height over that period might stay relatively constant. Therefore, any given wave peak during this period might not contact any of the vanes or might be higher than the vanes and thus not contact well with any of them. Furthermore, over longer periods, the mean or median amplitude of the waves will vary with weather and other conditions. To accommodate variations of, for example, median or mean wave heights, the height of the coupler above the water may, for example, be made adjustable using an adjustable frame, which is represented in the figure by adjustable length hangers 114 that suspend the coupler from the frame 103 of the harvester. The hangers may take the form of, for example, one or more linkages that include hydraulic cylinders, rack and pinions, gears, chains, cables, chains, and combinations of them. However, the coupler may, alternatively or in addition, be supported on jacks or similar structures located on the frame below the level of the coupler or to the side coupler. It is preferable, though not required, that the angle of the coupler be adjustable for reasons previously discussed.

For a given period, the y-axis position of the coupler could be set based on, for example, a median or mean wave height using previously determined calibrations of median or mean wave height with a measured power output of the coupler, forces on vanes, or other parameters. Furthermore, the height and orientation of the coupler may be configured for dynamic adjustments, either manual or automated (such as through a feedback loop controller C), based on or in response to one or more measured parameters. Representative and non-limiting examples of such parameters include any one or a combination of any two or more of the output power of the coupler, the velocity of the vanes, the measured forces on the vanes, the sensed height of the waves, the tidal conditions, and the weather conditions. The positioning of the coupler may, optionally, be based on or consider forecasted wave heights, especially if the time it takes to adjust the height is relatively long.

The harvester may also incorporate an artificial seafloor using a subsurface structure beneath the coupler, which is conceptually represented by a plate 116 that is positioned below the coupler 100 and hung from the harvester. The plate slopes upward from front to back. The artificial seafloor interacts with the waves by interfering with the movement of water molecules at the bottom, causing the top of the waves to move in a manner that can be used to improve coupling the vane with a wave top. It may also increase the velocity and kinetic energy of the water at the top of the wave.

A vane 102 may, optionally, be configured for coupling with the conveyor in a manner that allows for its orientation with respect to the conveyor or its geometry (length and/or shape) to be adjusted to optimize the coupling of the vane with the wave peak. Each of the vanes could be, for example, coupled with the conveyor 104 to allow it to be pivoted, extended/retracted, and/or bent. For example, if adjustable, the angle, length, or shape of the vanes could be set to optimize the amount of force being applied to each vane based on the height and/or orientation of the coupler above the water, the wave heights, the variability of wave heights, and/or other conditions. The orientation, length, and/or shape of a vane relative to the conveyor may, optionally, be dynamically adjusted or changed as it moves from front to back.

The water wave energy harvester may, optionally, include or communicate with a programmed computer, microcontroller, or similar device—each of which is an example of a controller C—that receives as inputs one or more of the following: predicted measurements or actual measurements indicative of expected or actual direction of prorogation of waves and/or wave heights; the actual force of impact of waves on one or more of the vanes (including, optionally, the relative position of the vane when impacted); the speed of movement of the conveyor. In response, the controller C generates one or more outputs to adjust the orientation of the conveyor, the height of the conveyor, the path of the conveyor, and/or the orientation, length, and/or shape of the vanes on the conveyor.

Figure 2:
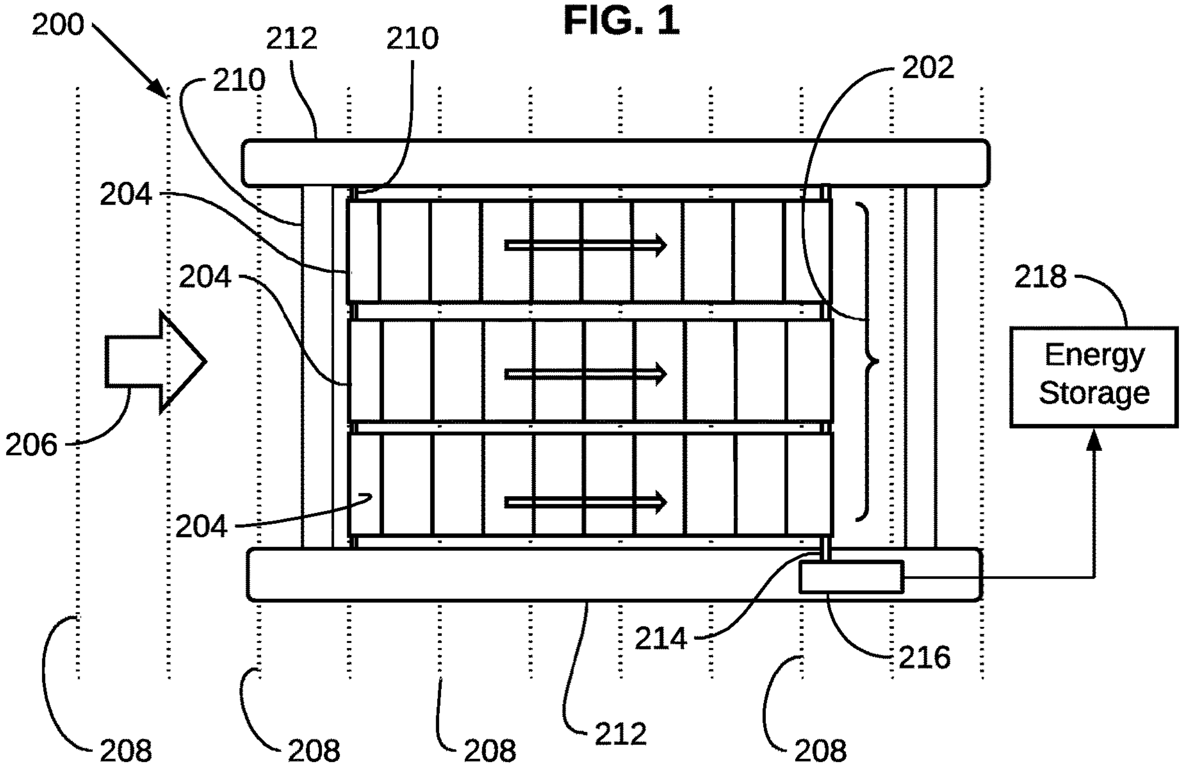
FIG. 2 is a schematic representation of a representative, non-limiting embodiment of a water wave energy harvester incorporating a longitudinal wave coupler.
Figure 3:
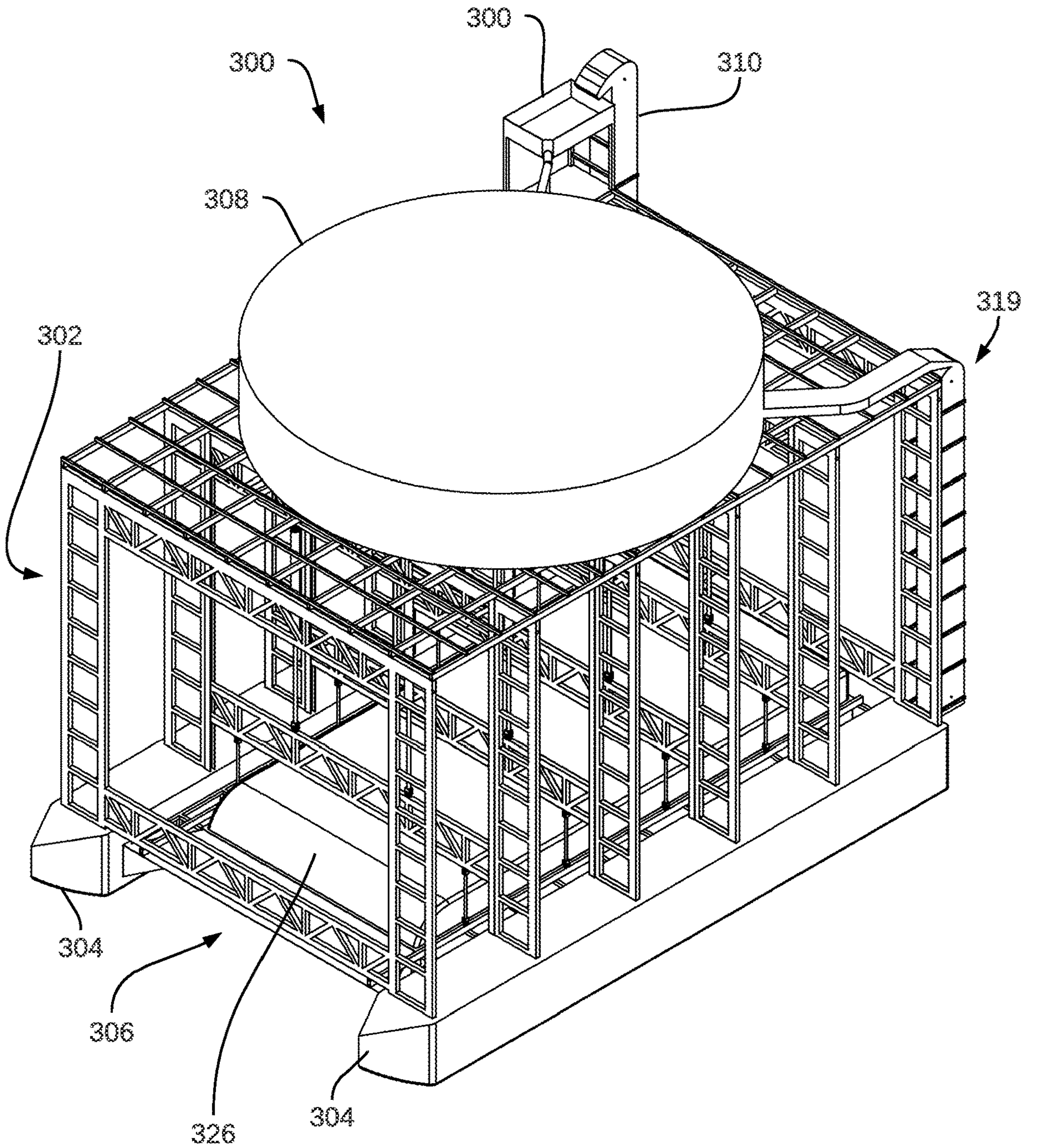
FIG. 3 is a perspective of a schematic representation of a representative embodiment of a wave energy harvester for converting the kinetic energy of water at the top or peaks of waves to stored potential energy.
Figure 4:
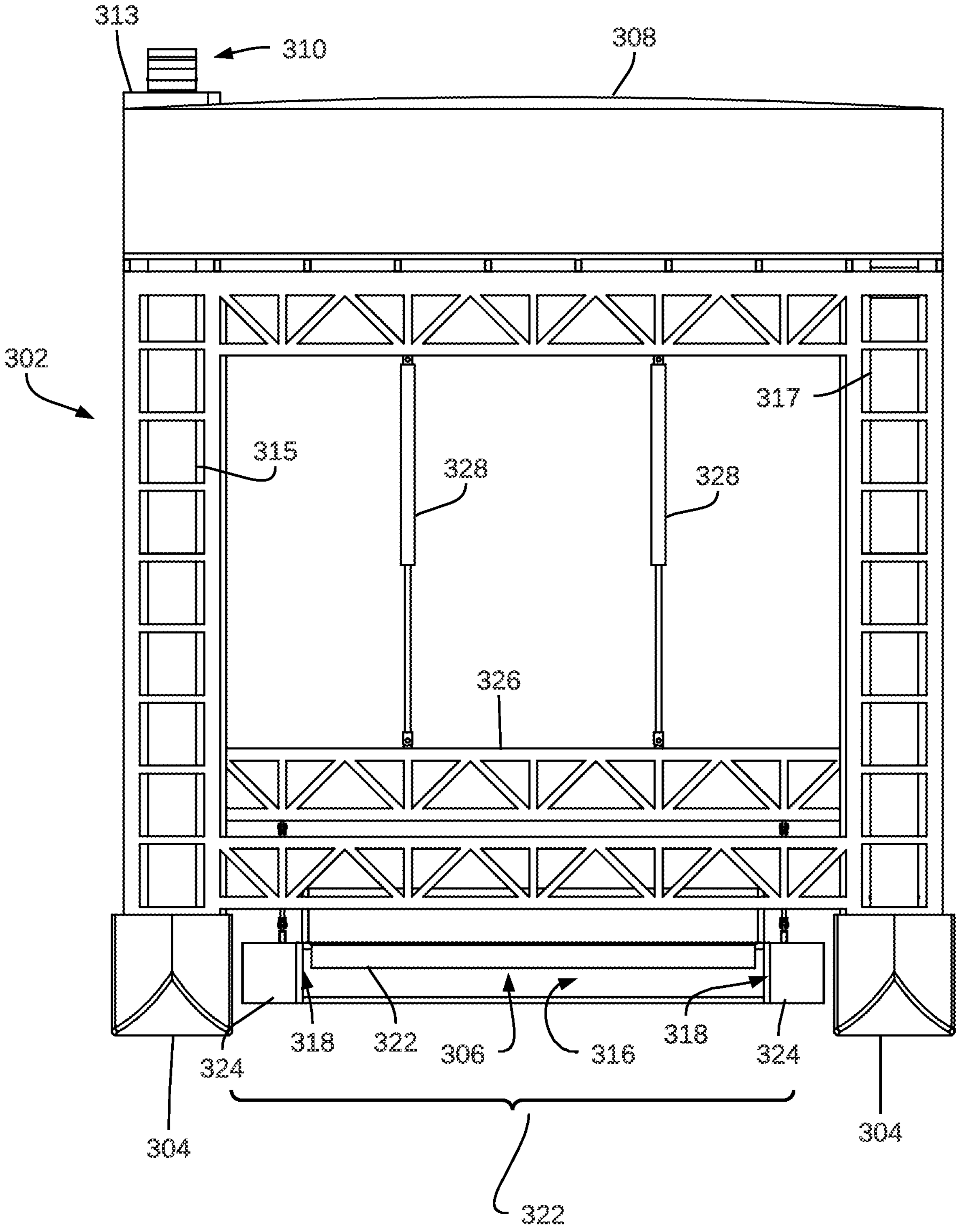
FIG. 4 is a front view of the schematic of the representative embodiment of a wave energy harvester of FIG. 3.
Figure 5:
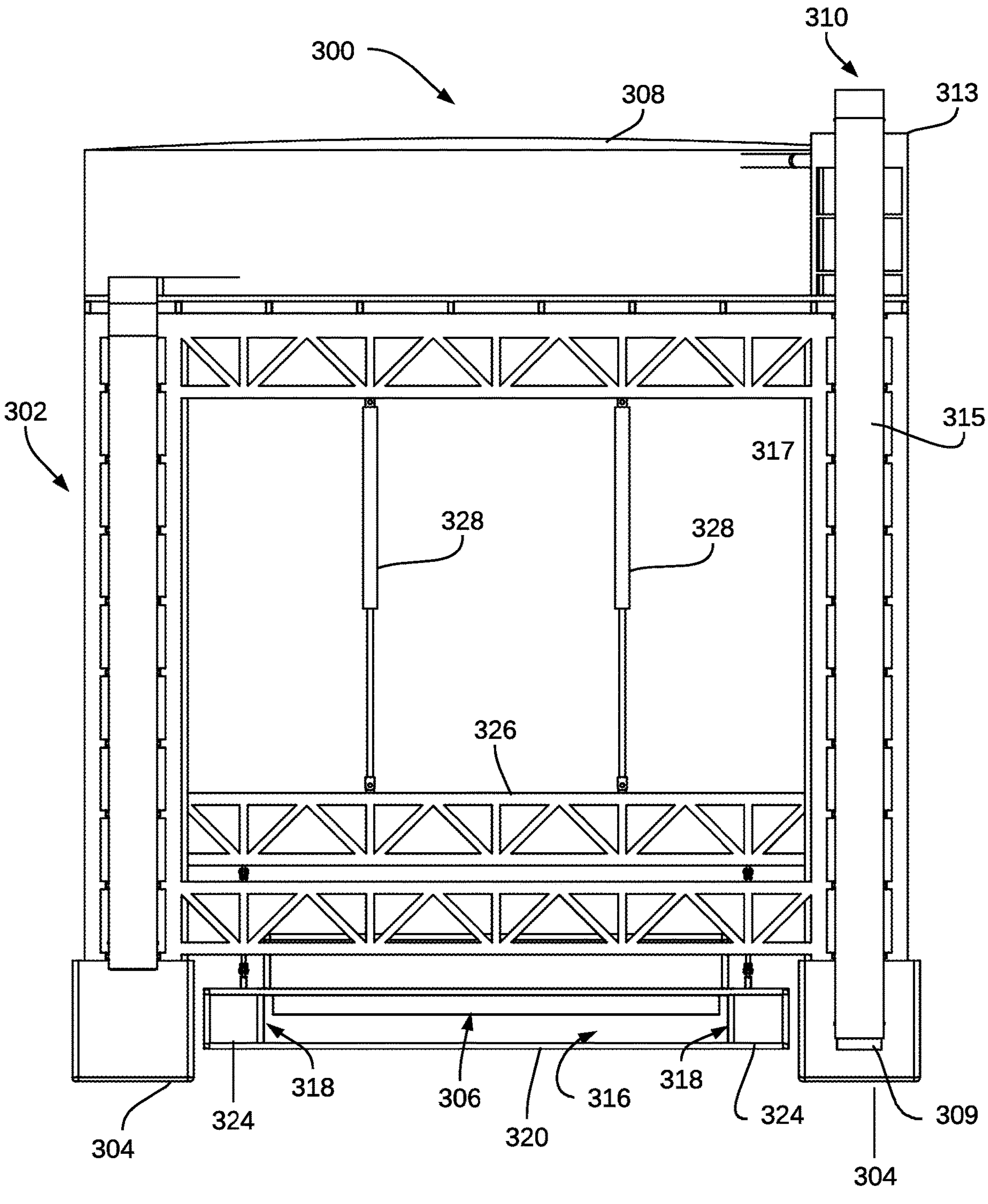
FIG. 5 is a rear view of the schematic of the representative embodiment of a wave energy harvester of FIG. 3
Figure 6:
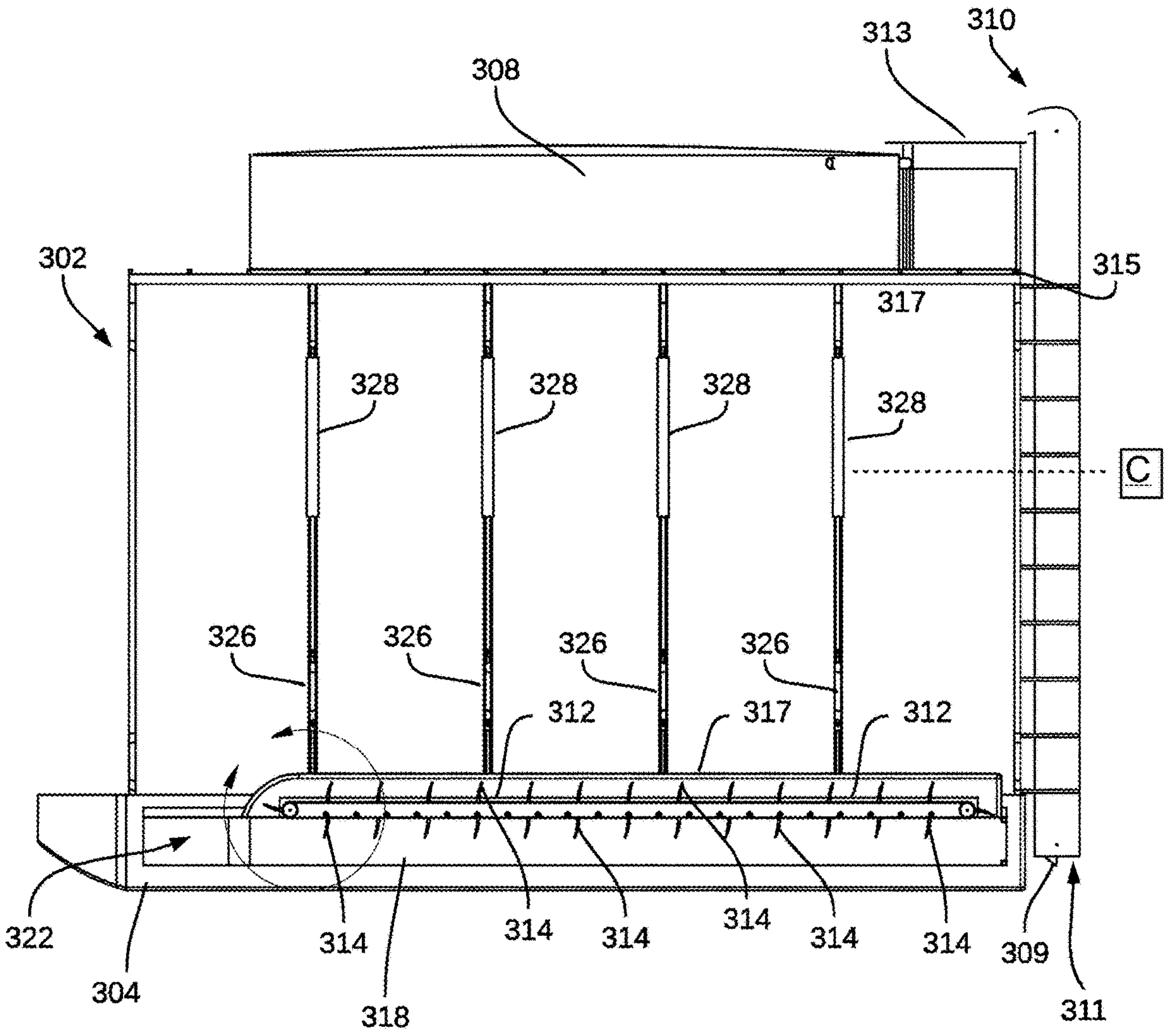
FIG. 6 is a cross-section side view of the schematic of the representative embodiment of a wave energy harvester of FIG. 3.

FIG. 2 is a schematic representation of a representative, non-limiting embodiment of a water wave energy harvester incorporating a longitudinal wave coupler, such as one described in connection with FIG. 1 or any others described herein.

Wave energy harvester 200 has an array 202 of longitudinal wave couplers 204, each of which is oriented in the direction of travel 206 of waves. The wave tops 208, represented by dotted lines, extend in a direction that is generally orthogonal to the direction of travel of the waves. The array of wave couplers 204 in this example is a three-by-one array: one row of three couplers. However, there is no inherent limit on the number of longitudinal wave couples in an array or in how they are arranged. The longitudinal wave couplers may also be arranged in one or more columns, each oriented generally along the direction in which the waves are traveling. The wave couplers in a column would be, for example, arranged in a back-to-front fashion, with the back of the first one adjacent to the front of the next one and so on. If multiple columns are used, each column need not necessarily have the same number of columns.

Arranging couplers to form a row of couplers increases the effective width of the coupling of the harvester with the waves without having to increase the size of the coupler. Greater width increases the total possible amount of kinetic energy that can be harvested from passing waves. Arranging couplers front-to-back extends the total longitudinal distance that the harvester couples with waves passing it, thus increasing the total duration in which the coupler is in contact with a wave traveling beneath the coupler, thus increasing the total amount of energy transferred. In comparison to a single, large coupler, assembling multiple relatively smaller couplers into an array makes building and deploying them easier. It may also make the overall operation of the harvest better and more reliable. Each coupler can be individually adjustable, allowing better coupling in areas where wave heights might not be consistent across the harvester. A failure of one coupler need not impair the functioning of the remaining couplers in the array.

In this example, the array of couplers is mounted to a frame 210 held above the water by multiple supports, which are schematically represented by supports 212. The supports may have one or more floating structures. Each floating structure may, optionally, be anchored to the seafloor beneath them and/or tethered to nearby land. The floating structures may also take the form of one or more hulls of a ship or other type of sea vessel that is moored or moving. In such an embodiment, the supports of the wave energy harvester could be attached to one side of a hull, between hulls, or incorporated into the hull. Alternatively, supports 212 may take the form of fixed, non-floating structures extending from the seafloor or on adjacent land. The supports may also include a combination of fixed and floating structures.

Each rotational output of a longitudinal wave coupler is coupled directly or indirectly with one or more systems that store energy, feed electrical power to, for example, an electrical power distribution system, or perform work using the energy. Any two or more longitudinal wave couplers may be coupled with a single rotational output for coupling with a system for storage, power generation, and/or work. Thus, an array of two or more longitudinal wave couplers may have one or more outputs.

In the example of FIG. 2, the three longitudinal wave couplers 204 are coupled together to rotate a single output 214 for the array that is coupled directly or through a transmission to a converter 216. The transmission may include a coupling that changes rotational speeds or torque as necessary to load the coupler and elements using, for example, a flywheel or other type of arrangement that can be used for this purpose. Power transmitted by the output is, in one embodiment, converted to stored energy by converter 216 for storage in one or more energy storage systems, represented by energy store 218. Energy from the energy store can be used to generate power for an electric distribution grid in response to a spike in demand. The energy store may but does not have to be located or supported on the wave energy harvester 200. For example, it could be located adjacent to the harvester or on land if the harvester is close to the land. The energy store may, optionally, also function as a central energy store for multiple wave energy harvesters.

A representative and non-limiting example of an energy store 218 is an elevated water tank that stores water lifted from the body of water, such as the one on which the harvester is located. The potential energy of the water in the tank can be used to turn, for example, an input to an electric generator or as an input to another system to perform work. The water tank may, but it does not have to be supported by the harvester. It could be located anywhere that is higher than the body of water that is the source of the water being lifted to the tank. If supported on the harvester, the tank may be positioned above the longitudinal wave couplers to make more efficient use of space. Any hydroelectric generator or other means for converting the potential energy of the elevated water to work to rotate the input of an electric generator could be used. Examples of a hydroelectric generator include an electric generator driven by a turbine and an electric generator driven by a water bucket conveyor. A bucket conveyor has multiple buckets, each capable of holding water, that are attached to a closed-loop conveyor that is oriented vertically. Buckets are filled with water when next to the water tank and then move in a linear fashion downward, with the weight of the water in each bucket applying a force to the conveyor. The movement of the conveyor rotates an output that is used to perform work, such as by coupling an electric generator to the output to generate electricity. Turbines rely to some degree on the velocity of a water flow for efficient operation and are efficient. However, a bucket conveyor might have certain advantages in applications in which water flow is variable or is subject to stops and starts. The amount of energy from a water wave harvester will obviously vary based on wave conditions, and one used for a wave harvester might be supplemental electric generation capacity to provide power in response to a spike in demand for power from an electric power grid.

In the example of an energy store 218 comprising an elevated water tank, a converter 216 includes a water lift that is mechanically driven by the output 214. Representative, non-limiting examples of a water lift include one or more pumps and water elevators. A water elevator lifts a volume of water in a bucket or similar structure attached to a closed-loop conveyor, such as a belt or set of chains. The conveyor is moved by rotating an input that is coupled with the conveyer. Rotating the input moves the conveyor. The conveyor is positioned to dip the buckets into the body of water. Filled buckets are carried to and dumped into the elevated tank.

In the example of a water pump, it is preferable that it be a positive displacement pump. A positive displacement pump assembly or a water elevator that turns only one direction using, for example, a dog or similar mechanism, or that restricts water flow to one direction using, for example, a one-way valve will allow for the pump to cycle on and off, or change speed, without loss of water that is part-way up to the elevated tank from flowing back in the event that the output from the couplers 204 stops or slows to the point that there is insufficient power to lift the water further. However, a positive displacement pump is not required. Rather than being mechanically driven by the output 214, another example of an embodiment of converter 216 includes an electric generator (or more than one) and one or more electric motors that are powered directly by the electric generator or indirectly through a battery charged by the electric generator to operate the water lift system, whether it is a pump or a water elevator such as a bucket conveyor.

Another example of an embodiment of an energy store 218 is a battery to store an electric charge. The battery may be the sole type of energy store or could be used in combination with other types of energy stores, such as an elevated water tank. In an example of this, converter 216 includes one or more electric generators rotated by output 214. The current generated by the electric generator may be used to charge the battery. It may also be supplied directly to a power grid or used to perform other types of work. The current could also be used to power directly other systems associated with the harvester when needed. It may also be selectively used to charge an electric energy store, for power distribution, and to perform work for operating the wave energy harvested and associated systems.

Alternatively, a wave energy harvester such as any of those disclosed above could be mounted in mounted on the outside of a hull of a moving ship boat or between hulls of a multihull ship or boat.

FIGS. 3 to 6 are different views of a schematic representation of an embodiment of a wave energy harvester 300 for converting the kinetic energy of water at the top or peaks of waves to stored potential energy. Wave energy harvester 300 is an example of one embodiment of the wave energy harvesters described in connection with FIGS. 1 and 2. The wave harvester 300 has a support structure 302 that is mounted on and extends between floating pontoons 304. A representative example of a longitudinal wave coupler 306 is positioned above a body of water (not shown) by hanging it between the pontoons 304 from the support structure 302. Although only one is shown, multiple waver couplers may be placed side-by-side between the pontoons. Instead of pontoons, the waver energy harvester may be mounted on one or more structures fixed to the seafloor or on other types of floating structures, examples of which include inside or mounted on the hull of a boat hull, along one side of a boat hull, or between boat hulls.

Energy harvested from waves is stored by lifting water to an elevated water tank 308 with a water elevator 310 that is driven by an output of the longitudinal wave coupler 306. As the conveyor moves, a bucket 309 connected with a vertical, closed-loop conveyor is immersed in the water at the bottom 311 of the conveyor and then carried to the top of the conveyor where it is dumped into, for example, a water catch pan 313 as it turns at the top of the conveyor. The water dumped into the catch pan drains into the water storage tank 308. The conveyor has multiple buckets spaced along its length at regular intervals, which cannot be seen because the conveyor with buckets is enclosed within housing 315. Releasing water to bucket conveyer 319 will convert the potential energy stored by the elevated water. The bucket conveyor has multiple buckets attached to a closed-loop conveyor that is oriented vertically. The conveyor and buckets are enclosed in housings that obscure them in these views. Buckets are filled with water when next to the water tank and then move in a linear fashion downward, with the weight of the water in each bucket applying a force to the conveyor. The movement of the conveyor rotates an output (not shown) that is used to perform work. For example, the output can be coupled to an electric generator (not shown) to generate electricity.

The wave coupler 306 includes a continuous loop belt 312. Vanes 314 are coupled at regular intervals along the length of belt 312 in fixed positions relative to the belt. As described above, chains, cables, and similar arrangements structures could be used in place of, or in addition to, the belt. Each of the vanes 314 extends transversely across the width of belt 312. When water at the top of a wave hits one of the vanes 314, pointing downwardly, the force of the impact is transferred to the belt, causing the belt to translate in the same direction as the waves are propagating. A shield 317 extends over the top, front, back, and sides of the coupler to protect the vanes on top of the coupler from water and wind as they move toward the front of the coupler. Large waves that crash over belt 312 and wind could otherwise apply a counteracting force to the vanes and thus slow the movement of the belt.

In this embodiment, an optional wave tunnel 316 is defined by the belt 312, which functions as a top wall, side walls 318, and a submerged bottom wall 320 extending below the coupler along its length that functions as an artificial seafloor. The wave tunnel 316 may function to increase the total amount of kinetic energy of the water molecules in a wave that is transferred to the coupler. An inlet 322 of the wave tunnel is defined by two side panels 324 that flair outwardly from the side walls 318 in front of the coupler and are wider than the wave tunnel to increase the amount of energy entering the wave tunnel.

Multiple lift structures 326 for the longitudinal wave coupler 306 are hung from the support structure 302 by linear actuators 328. The lift structures attach to the longitudinal wave coupler 306 at multiple points along its length to position the longitudinal wave coupler above the water at a height and orientation that allows the vanes 314 to engage waves passing beneath it. Operating the hydraulic cylinders raises and lowers the longitudinal wave coupler 306. Other types of means for raising and lowering the longitudinal wave coupler 306 may be used, such as cables, chains, ropes, pivoting linkages, and combinations of them. Each lift structure can be operated independently to allow the longitudinal wave coupler 306 to be tilted with respect to the water line to improve the amount of contact and, thus, the amount of force transmitted to vanes by waves as they propagate towards the rear of the wave coupler. As a wave propagates under the wave coupler, it will likely lose amplitude as a result of the top of the wave hitting a vane due to the transfer of kinetic energy. Titling, in effect, lowers the position of the blades with respect to the water level as they move toward the back. The wave coupler may also be configured to move the vanes along a curved rather than straight path, as shown.

Any of the structures shown or described in the example of FIGS. 3 to 6 may be substituted for, omitted, or supplemented with the corresponding structures described above in connection with the embodiment of FIGS. 1 and 2 and their equivalents.

The terms "comprise," "have," "include," "contain," "involve" and variations of them are open-ended linking verbs that signal a nonexclusive listing and thus permit the addition of other elements. Without limiting the foregoing, the term "comprising" when used in claims should be interpreted in the manner typically done in patents, which is to mean including but not limited to. On the other hand, the phrase "consisting of" when used in a claim implies a closed set of elements. The phrase "consisting essentially of" when used in a claim excludes additional material elements but allows the inclusions of non-material elements. A material element is one that substantively modifies, adds to, or subtracts from the functionality or nature of the subject matter recited in the claim.

The use of the word "a" or "an" when used in conjunction with the term "comprising" in the claims or the specification means one or more than one unless the context dictates otherwise.

The use of the term "or" in the claims is used to mean "and/or" unless explicitly indicated to refer to alternatives only or if the alternatives are mutually exclusive.

If the specification states a component, feature, or limitation "may," "can," "could," "should," "would," "preferably," "possibly," "typically," "optionally," "for example," "often," or "might" (or other such language) be included or have a characteristic, the component, feature, or limitation is not required to be included or to have the characteristic. Such component or feature may be optionally included in an embodiment, or it may be excluded. Unless stated otherwise, the terms "couple," "coupled," "," "connect," "connection," "connected," "in connection with," and "connecting" mean in direct connection with, integral with, or indirect connection with through one or more intermediate elements or members.

The statement of a benefit, advantage, or objective with respect to an invention or representative embodiment should be understood as meaning that the invention or embodiment makes it easier to achieve the benefit, advantage, or objective to be achieved, if desired. It does not imply that the invention or embodiment must always have the stated benefit or advantage or achieve the stated objective. Nor does the loss of stated benefit, advantage, or objective if an element or limitation is omitted or modified imply that an element or limitation is essential and thus cannot be omitted or changed.

The foregoing description is of exemplary and preferred embodiments. The invention, as defined by the appended claims, is not limited to the described embodiments. The embodiments are, unless otherwise noted, non-limiting examples of one or more inventive features. Alterations and modifications to the disclosed embodiments may be made without departing from the invention. The meanings of the terms used in this specification are unless stated otherwise intended to have their ordinary and customary meaning to those in the art and are not intended to be limited to specific implementations that may be described.

What is claimed is:

1. An apparatus for harvesting kinetic energy from wave peaks comprising:

a wave coupler;

a support frame for positioning the wave coupler above a body of water to permit water waves to propagate beneath the wave coupler; and a plate coupled to the support frame below the wave coupler, the plate including a front plate end proximate a front end of the wave coupler and a back plate end proximate a back end of the wave coupler, wherein the wave coupler comprises:

a closed-loop conveyor mounted to the support frame, the conveyor configured for translating along a front-to-back path on an underside of the wave coupler from the front end of the wave coupler to the back end of the wave coupler and returning to the front end of the wave coupler along a back-to-front path on a top side of the wave coupler;

a plurality of spaced-apart wave contacting surfaces connected for movement with the conveyor that are positioned below the conveyor as it translates along the front-to-back path to contact with water waves passing beneath the wave coupler, a force of impact from water waves on the wave contacting surfaces being transmitted to the conveyor;

a rotational output coupled with the conveyor that rotates in response to movement of the conveyor wherein the plate slopes toward the wave coupler as it extends from the front plate end to the back plate end.

2. The apparatus of claim 1, wherein the conveyor comprises one or more chains or cables to which the wave contacting surfaces are connected.

3. The apparatus of claim 1, wherein the conveyor defines a substantially solid, continuous surface.

4. The apparatus of claim 1, further comprising a shield extending over the front end of the conveyor to block waves from impacting wave contacting surfaces positioned along the back-to-front path.

5. The apparatus of claim 1, further comprising a plurality of spaced-apart vanes connected for movement with the conveyor, wherein each of the plurality of vanes defines one of the plurality of wave contacting surfaces.

6. The apparatus of claim 5, wherein each vane is connected to the conveyor by a hinge to permit the vane to articulate selectively about a fixed point.

7. The apparatus of claim 5, wherein each of the plurality of vanes is adapted for connection with the conveyor to vary a distance that each vane extends below the conveyor along the front-to-back path.

8. The apparatus of claim 5, wherein the wave contacting surface of each vane becomes progressively lower with respect to the support frame as it moves along the front-to-back path.

9. The apparatus of claim 5, wherein each of the plurality of vanes is adapted for adjustment of one at least its geometry or orientation.

10. The apparatus of claim 1, wherein the wave coupler is oriented with respect to the frame such that the front end of the wave coupler is higher than the back end of the wave coupler.

11. The apparatus of claim 10, further comprising an actuator coupling the wave coupler to the support frame, wherein the wave coupler defines a longitudinal axis passing through the front end and back end thereof, and wherein the orientation of the longitudinal axis relative to the frame is adjustable by adjusting the actuator.

12. The apparatus of claim 10, further comprising an actuator coupling the wave coupler to the support frame and a controller configured to actuate the actuator to adjust at least one of the height and the orientation of the wave coupler based on changes in wave heights as they propagate from front to back under the wave coupler to optimize contact between waves and the wave contacting surfaces.

13. The apparatus of claim 1, further comprising an energy converter coupled with the rotational output.

14. The apparatus of claim 1, further comprising a controller responsive to one or more of: predicted or actual measurements of conditions indicative of expected or actual direction of propagation of waves, mean wave heights, median wave heights, the force of impact of waves on one or more of the wave contacting surfaces, and a speed of movement of the conveyor; the controller, in response, generating one or more outputs to adjust any one or more of: the orientation of the conveyor, the height of the conveyor, the path of the conveyor, an orientation of the wave contacting surfaces, a length of the wave contacting surfaces, and a shape of the wave contacting surfaces.

15. The apparatus of claim 1, further comprising an actuator coupling the wave coupler to the support frame, the actuator being adjustable to shift at least one of a height and an orientation of the wave coupler relative to the support frame.

16. The apparatus of claim 15, wherein the actuator is one of a plurality of actuators coupling the wave coupler to the support frame, the plurality of actuators being adjustable to shift at least one of the height and the orientation of the wave coupler relative to the support frame, with the wave contacting surfaces are configured to move along at least one of a straight path or a curved path.

17. An apparatus for harvesting kinetic energy from wave peaks comprising:

a wave coupler;

a support frame for positioning the wave coupler above a body of water to permit water waves to propagate beneath the wave coupler;

a converter configured to convert kinetic energy of the wave to potential energy; and an energy store capable of storing the potential energy:

wherein the wave coupler comprises:

a closed-loop conveyor mounted to the support frame, the conveyor configured for translating along a front-to-back path on an underside of the wave coupler from a front end of the wave coupler to a back end of the wave coupler and returning to the front the end of the wave coupler along a back-to-front path on a top side of the wave coupler; and a plurality of spaced-apart wave contacting surfaces connected for movement with the conveyor that are positioned below the conveyor as it translates along the front-to-back path to contact with water waves passing beneath the wave coupler, a force of impact from water waves on the wave contacting surfaces being transmitted to the conveyor; and a rotational output coupled with the conveyor that rotates in response to movement of the conveyor, the rotational output coupled to the converter.

18. The apparatus of claim 17, wherein the wave coupler is one of a plurality of wave couplers each including a closed-loop conveyor, a plurality of spaced-apart wave contacting surfaces, and a rotational output, wherein the rotational output of each of the wave couplers are coupled together to perform work.

19. A method of harvesting energy from kinetic energy of waves on a body of water with a wave coupler, comprising:

supporting with one or more frames, at least one elongated, closed-loop conveyor in a generally horizontal orientation above a body of water to permit waves on the body of water to pass beneath it;

coupling movement of the conveyor with at least one rotational output and a converter configured to convert kinetic energy of the wave to potential energy;

performing work with the rotation of the at least one rotational output to convert kinetic energy of the wave to potential energy;

storing the potential energy in an energy store, wherein the conveyor is configured for translating along a front-to-back path on an underside of the wave coupler from a front end of the wave coupler to a back end of the wave coupler and returning to the front end of the wave coupler along a back-to-front path on a top side of the wave coupler; and wherein the wave coupler further comprises a plurality of spaced-apart vanes connected with the conveyor for movement with the conveyor when translating along the front-to-back path, the plurality of vanes extending downwardly from beneath the conveyor for contact with water waves passing beneath the coupler and transmit a force of impact of the water waves on the vanes to the conveyor.

20. The apparatus of claim 17, further comprising an actuator coupling the wave coupler to the support frame, the actuator being adjustable to shift at least one of a height and an orientation of the wave coupler relative to the support frame.

* * * * *